US011404704B2

(12) United States Patent
Gromadskyi

(10) Patent No.: US 11,404,704 B2
(45) Date of Patent: Aug. 2, 2022

(54) METHOD FOR PRODUCING A SEPARATOR PLATE FOR A FUEL CELL AND A METHOD FOR PRODUCING A FUEL CELL STACK WITH SUCH SEPARATOR

(71) Applicant: fischer Eco Solutions GmbH, Achern-Fautenbach (DE)

(72) Inventor: Denys Gromadskyi, Aalborg Øst (DK)

(73) Assignee: fischer Eco Solutions GmbH, Achern-Fautenbach (DE)

( * ) Notice: Subject to any disclaimer, the term of this patent is extended or adjusted under 35 U.S.C. 154(b) by 20 days.

(21) Appl. No.: 16/342,336

(22) PCT Filed: Oct. 16, 2017

(86) PCT No.: PCT/DK2017/050343
§ 371 (c)(1),
(2) Date: Apr. 16, 2019

(87) PCT Pub. No.: WO2018/072803
PCT Pub. Date: Apr. 26, 2018

(65) Prior Publication Data
US 2019/0260037 A1    Aug. 22, 2019

(30) Foreign Application Priority Data
Oct. 19, 2016 (DK) .......................... PA 2016 70823

(51) Int. Cl.
*H01M 8/0213* (2016.01)
*H01M 8/0221* (2016.01)
(Continued)

(52) U.S. Cl.
CPC ....... *H01M 8/0213* (2013.01); *H01M 8/0221* (2013.01); *H01M 8/0226* (2013.01); *H01M 8/0258* (2013.01); *Y02P 70/50* (2015.11)

(58) Field of Classification Search
None
See application file for complete search history.

(56) References Cited

U.S. PATENT DOCUMENTS 6,500,585 B1 * 12/2002 Saakes ............... H01M 4/20
429/232
6,544,680 B1    4/2003 Takano
(Continued)

FOREIGN PATENT DOCUMENTS

| CN | 101174695 A | 5/2008 |
|----|-------------|--------|
| DE | 3538732 A1 | 6/1986 |

(Continued)

OTHER PUBLICATIONS

Machine Translation CN101174695A (Year: 2008).*
(Continued)

*Primary Examiner* — Victoria H Lynch
(74) *Attorney, Agent, or Firm* — Cermak Nakajima McGowan LLP; James Creighton Wray

(57) ABSTRACT

A production method for a fuel cell separator comprises the steps of providing a powder blend of at least 70% carbon powder, 0.5-5% PTFE, PolyTetraFluoroEthylene, and 0-20% thermoplastic polymer different from PTFE. The powder is sedimented as slurry in a suspension, excess liquid removed from the slurry, and the remaining slurry press-moulded into a shape of a separator plate, for example for use in a fuel cell stack.

10 Claims, 4 Drawing Sheets

(51) Int. Cl.
  *H01M 8/0226* (2016.01)
  *H01M 8/0258* (2016.01)

(56) References Cited

U.S. PATENT DOCUMENTS

| | | | |
|---|---|---|---|
| 7,910,501 | B2 | 3/2011 | Jiang |
| 7,919,213 | B1 | 4/2011 | Becker |
| 8,097,385 | B2 | 1/2012 | Kunz |
| 9,065,086 | B2 | 6/2015 | Budinski |
| 2002/0028368 | A1 | 3/2002 | Saito |
| 2004/0146768 | A1 | 7/2004 | Nishihata |
| 2004/0229993 | A1 | 11/2004 | Huang |
| 2005/0271798 | A1 | 12/2005 | Zhong |
| 2008/0003166 | A1 | 1/2008 | Maletin |
| 2014/0087287 | A1* | 3/2014 | Suzuki ............... H01M 8/0213 429/479 |
| 2016/0197360 | A1 | 7/2016 | Ihm |

FOREIGN PATENT DOCUMENTS

| | | |
|---|---|---|
| EP | 1758185 A1 | 2/2007 |
| EP | 3041076 A1 | 7/2016 |
| JP | S62147662 A | 7/1987 |
| JP | 2001514794 A | 9/2001 |
| JP | 2002231263 A | 8/2002 |
| JP | 2004193044 A | 7/2004 |
| JP | 2007173028 A | 7/2007 |
| JP | 2013120737 A | 6/2013 |
| KR | 20160033857 A | 3/2016 |
| RU | 2333575 C1 | 9/2008 |
| WO | 2009010066 A1 | 1/2009 |
| WO | 2009010067 A1 | 1/2009 |
| WO | 2012165492 A1 | 2/2015 |
| WO | 2015145406 A2 | 10/2015 |
| WO | 2016052912 A1 | 4/2016 |

OTHER PUBLICATIONS

Bingli Pan , Jing Zhao , Yuqing Zhang & Yongzhen Zhang (2012) Wear Performance and Mechanisms of Polyphenylene Sulfide/ Polytetrafluoroethylene Wax Composite Coatings Reinforced by Graphene, Journal of Macromolecular Science, Part B, 51:6, 1218-1227 , DOI: 10.1080/00222348.2011.627821 http://dx.doi.org/10. 1080/00222348.2011.627821.

Brent D. Cunningham?, Jianhua Huang, Donald G. Baird, "Development of bipolar plates for fuel cells from graphite filled wet-lay material and a thermoplastic laminate skin layer", published in Journal of Power Sources 165 (2007) 764-773.

Fluon—The moulding of PTFE granular powders, Technical Service Note F1, AGFP Oct. 2002.

Rungsima Yeetsorn, Michael W. Fowler and Costas Tzoganakis, "A Review of Thermoplastic Composites for Bipolar Plate Materials in PEM Fuel Cells", published on pp. 317-344, in Nanocomposites with Unique Properties and Applications in Medicine and Industry, Edited by Dr. John Cuppoletti (2011) ISBN 978-953-307-351-4, www.intechopen.com.

* cited by examiner

METHOD FOR PRODUCING A SEPARATOR PLATE FOR A FUEL CELL AND A METHOD FOR PRODUCING A FUEL CELL STACK WITH SUCH SEPARATOR

This application claims the benefit of Danish Application No. PA 2016 70823 filed Oct. 19, 2016 and PCT/DK2017/050343 filed Oct. 16, 2017, International Publication No. WO 2018/072803 A1, which are hereby incorporated by reference in their entirety as if fully set forth herein.

FIELD OF THE INVENTION

The present invention relates to a fuel cell stack and its method of production, a separator plate for a fuel cell and its production.

BACKGROUND OF THE INVENTION

International patent applications WO2009/010066 and WO2009/010067 by Serenergy disclose proton exchange membrane (PEM) fuel cells where the membrane is sandwiched between rigid separator plates, especially bipolar plates, which mainly contain graphite and a binder.

In connection with fuel cell stacks, especially for PEM (proton exchange membrane) fuel cells, the term separator plate is used for a rigid plate that separates membranes with a flow structure, typically channels, for flow of hydrogen fuel and oxygen-containing gas, and potentially also for flow of water, triethylene glycol (TEG) or silicone oil for cooling. Separator plates include bipolar plate, cooling plates, anode plates and cathode plates. A bipolar plate has a first side with a first flow structure for provision of hydrogen fuel to the fuel cell membrane and an opposite, second side with a second flow structure for provision of oxygen to the neighbouring cell membrane. The oxygen is typically provided from air, which has a cooling effect on the fuel cell. In alternative configurations for fuel cells, there is provided an anode plate with first side having a flow structure for providing hydrogen to the fuel cell membrane and a cathode plates have a first side with a flow structure for providing oxygen to the fuel cell membrane. The membrane is then provided between the anode plate and the cathode plate. Optionally the anode plate or the cathode plate or both have an opposite, second side which has a flow structure for coolant flow, for example water as a coolant. The term separator plate also includes a cooling plate having on both sides a water flow structure for providing cooling to corresponding anode and cathode plates adjacent to the cooling plate. Examples of various configurations are given in WO2009/010066 and WO2009/010067, where also the use of a cooling plate between an anode plate and a cathode plate is disclosed.

An overview of composites for production of bipolar plates is disclosed in the article "A Review of Thermoplastic Composites for Bipolar Plate Materials in PEM Fuel Cells" by Yeetsorn et al., published in the book, "Nanocomposites with Unique Properties and Applications in Medicine and Industry" ISBN 978-953-307-351-4 edited by Dr. John Cupoletti and published on the Internet on WWW.intechopen.com in 2011. In this article, the authors discuss that thermoplastic resins, such as polypropylene (PP), polyethylene (PE), poly (vinylidene fluoride) (PVDF), liquid crystalline polymer (LCP), poly (phenylene sulfide) (PPS), and fluoropolymer are used less in bipolar plate fabrication than thermosetting resins. As a reason, this disclosure states that thermosetting resins have low viscosity, and thereby contain a higher proportion of conductive fillers. Especially, epoxy resin is seen as a popular choice for a polymer composite bipolar plate production.

For bipolar plates, thermoplastics are disclosed in U.S. Pat. No. 9,065,086 and both thermoplastics and thermosetting resins are discussed in U.S. Pat. No. 7,910,501.

Wet lay production techniques for bipolar plates are disclosed in the article "Development of bipolar plates for fuel cells from graphite filled wet-lay material and a thermoplastic laminate skin layer" by Cunningham et al, published in Journal of Power Sources 165 (2007) 764-773. In this article, a composite mix of Carbon powder and PTFE is used.

A similar approach is found in Russian patent RU2333575C, disclosing a carbon layer on a metal substrate in order to provide a bipolar plate. In more detail of this method, carbon powder and 1.5% PTFE (PolyTetraFluoroEthylene also called Teflon™) in an alcohol suspension are mixed, dried and ground. A second mixture of carbon powder and 15% PTFE is formed into a sheet on the metal substrate. The ground powder is provided on the sheet and pressed at (250 kgf/cm2=25 MPa) at 140 degrees. Binder suspensions containing PTFE for mixing with carbon for electrode production is also disclosed in US patent application US2008/00031166.

EP1758185 describes a method of forming a separator for a fuel cell, the separator comprising by weight 79% graphite powder, 5% carbon black, 2% PTFE powder and 14% thermally uncured epoxy resin. The compound is injected into a metal mold and pressed at 180° C. to form a separator having passage grooves. The separator is used for PEM fuel cell stacks.

As an overall conclusion, a large variety of compositions are disclosed in the prior art for bipolar plates, but there is no general agreement on optimum production methods and materials. However, there is a clear trend towards continuous refinement end improvements in different directions, be it thermosetting or thermoplastic resins. A pronounced driver for this development is a continuously growing fuel cell market.

DESCRIPTION/SUMMARY OF THE INVENTION

It is therefore the objective of the invention to provide an improvement in the art. Especially, it is an objective to provide an improved production technique and improved material for separator plates in fuel cells. This objective is achieved with a method for production of a separator plate and a fuel cell stack with such plates as described in the claims and in more detail in the following. A definition of a separator plate, for example bipolar plate, was given in the introduction above.

The method of producing a separator plate for a fuel cell comprises providing a material blend of at least 70% carbon powder, 0.5-5% PTFE, PolyTetraFluoroEthylene, and 10-20% thermoplastic polymer different from PTFE and moulding the blend into a separator plate. All percentages are by weight of the material of the final separator plate after evaporation of liquids that are involved in the process.

The carbon powder should be electrically conducting. Examples of carbon powder are graphite, carbon black, graphene, carbon nanotubes or amorphous carbon. The first two types of carbon are preferred. Typically, the size of the grains in the carbon black powder is in the sub-micron range, for example with an average size of between 20 and 100 nm. For graphite powder, the average grain size is in the range of 0.1 to 20 microns, typically however, in the range of 0.25 to 5 microns.

Examples of thermoplastic polymer are acrylonitrile butadiene styrene (ABS), cellulose acetate (CA), cellulose acetate butyrate (CAB), cellulose acetate phthalate (CAP), cyclo-olefine copolymer (COC), polyamide (PA), polyamide-imide (PAI), polybenzimidazole (PBI), poly-1-butene (PB), polybutylene terephthalate (PBT), polycarbonate (PC), polylactic acid (PLA), polychlorotrifluoroethene (PCTFE), polyether ether ketone (PEEK), polyether sulfone (PES), polyethylene (PE), polyetherimide (PEI), polyethylene terephthalate (PET), polyphenylene oxide (PPO), polyphenylene sulfide (PPS), polymethyl methacrylate (PMMA), polypropylene (PP), polyphenylene oxide (PPO), polystyrene (PS), polyvinyl chloride (PVC), polyvinylidene chloride (PVDC), polyvinylidene fluoride (PVDF) and mixtures thereof. Good experimental results were obtained with polyphenylene sulfide (PPS) as the polymer. PPS is an attractive candidate due to its chemical resistance and stabilty.

For example, the PTFE is provided as a powder of finely divided PTFE. Examples of particle sizes are in the range of 0.2 to 10 microns, optionally in the range of 0.5 to 5 microns or even in the range of 0.5 to 2 microns.

The carbon powder, thermoplastic polymer, and PTFE are provided as a blend of powder in a suspension, in which the powder is caused to sediment as slurry in the suspension. Optionally excess liquid is removed from the slurry. The slurry is press moulded in a mould into a shape of a separator plate, for example including a potential channel flow pattern on one or both sides as initially discussed for a separator plate, for example a bipolar plate, anode plate, cathode plate or cooling plate.

For example, the carbon powder is mixed with the molten thermoplastic polymer, and the mix is compounded to pellets. The hardened pellets are ground to a fine carbon-polymer powder prior to mixing with the finely divided PTFE in a suspension.

Although, it is possible, in principle, to mix the dry carbon-polymer powder into the PTFE suspension, it is in some embodiments preferred that the carbon-polymer powder is suspended in a first liquid prior to mixing it with the PTFE suspension. As the first liquid, alcohol or a liquid mainly containing alcohol, is a good option. An alcohol is a preferred basis in order to prevent clogging of the carbon-polymer powder. Examples of alcohol are methanol, ethanol, propanol, iso-propanol, butanol, iso-butanol, pentanol, iso-pentanol, hexanol, iso-hexanol, heptanol, iso-heptanol, octanol, isooctanol or their mixtures. The alcohol acts as a surfactant for the carbon, which is hydrophobic, adsorbing on its surface and thereby improving wettability of carbon particles by aqueous suspension of PTFE. A preferred surfactant is iso-propanol, which has good surface activity, high solubility in water, as well as relatively low boiling point.

A second liquid is used for this PTFE suspension, for example water or a liquid containing mainly water. Optionally, in order to further prevent clogging of the particulate PTFE in the suspension, the suspension comprises a surfactant. An example of a surfactant is Triton X-100™ (commercially available from SigmaAldrich®), which is a non-ionic and has a hydrophilic polyethylene oxide chain and an aromatic hydrocarbon lipophilic or hydrophobic group. The hydrocarbon group is a 4-phenyl group. The formula is $C_{14}H_{22}O(C_2H_4O)_n (n=9-10)$. Optionally, the suspension comprises 50-60% PTFE, 6-12% nonionic surfactant, and the rest deionized water.

Advantageously, the PTFE water suspension is adjusted with respect to PTFE concentration prior to mixing with the carbon-polymer powder alcohol suspension. It has turned out that a high concentration of PTFE when mixed with the carbon-polymer powder alcohol suspension can lead to a high tendency for agglomeration of the PTFE particles, which is to be avoided. Whereas the purchased PTFE suspension (from SigmaAldrich®) comprises 60% PTFE in water, it is advantageously diluted to a PTFE concentration in the range of 2-10%, for example 4-8%, with deionized water prior to mixing with the carbon-polymer powder alcohol suspension. Good results were obtained experimentally with a 6% PTFE suspension.

The mixture of the two suspensions is heated to a temperature in the range of 65° C. to 195° C. The selection of the temperature is dependent on the type of alcohol selected such that the alcohol is boiling and thereby evaporating at least partly. The lower limit of 65° C. is determined by the boiling point of methanol and the upper limit of 195° C. by the boiling point of octanol. If the first liquid comprises blends of alcohols in addition to water, the temperature in the liquid will step wise rise such that the liquid with the lowest boiling point, for example methanol with a boiling point of 64.7° C., evaporates first, after which the temperature rises until the next higher boiling of a component of the liquid, for example 100° C. for water. It is also pointed out that in case of the alcohol forming an azeotrope mixture with water, like iso-propanol, this mixture will boil at a lower temperature than the boiling point of pure iso-propanol (80.4° C. vs. 82.5° C.) and without separation of the liquid components.

The mixture is kept at this temperature for a time in the range of 2 to 20 minutes, resulting in a slurry of agglomerations of particles, which sediment into a sludge that turns into a malleable and pliable substance.

In some embodiments, the boiling and evaporation procedure is stopped before all liquid, especially alcohol, is evaporated because some remains of alcohol are useful in the subsequent rolling process, as explained in the following. For example, the evaporation is stopped well before the sludge dries and, in some embodiments, before the alcohol is entirely evaporated. If the remaining liquid level after the evaporation step is well above the sludge level, for example due to remaining water, the remaining liquid is removed, for example by pouring it off the surface of the sludge.

Thus malleable and pliable substance is rolled into a sheet by a rolling press, at room temperature or at elevated temperature while the substance is still wet from the liquid, typically alcohol, and potentially a small amount of water. Residuals of alcohol play a role as plasticizer to PTFE, and it is believed that PTFE creates a fiber-like structure with the graphite/polymer compound when being exposed to the rolling press. The sheet is further kept at a temperature in the range of 100° C. to 270° C. in the range of 10 to 60 minutes to remove all liquid residuals, for instance, alcohol, water and potential surfactants, for example Triton X-100™. An example of a rolling process for carbon/polymer mixes is disclosed in US2005/0271798. A similar rolling procedure can be applied in connection with this method.

The rolled structure is moulded under pressure and elevated temperature in a stationary mould in which the separator plates are formed. For example, the moulding is done at a pressure in the range of 20 to 60 MPa, optionally in the range of 30 to 50 MPa. A suitable temperature is in the range of 250 to 320° C., for example in the range of 280 to 300° C., well below the sintering temperature of PTFE, which is typically in the range of 360 to 380° C., slightly above the crystalline melting point PTFE. When heating PTFE to or above the sintering point, it decomposes, which is to be avoided.

The structuring of the separator plates in the mould includes the potential forming of a flow pattern, for example channels for flow of hydrogen fuel, oxygen-containing gas, or coolant, for example liquid coolant, such as water, TEG or silicone oil. After the moulding, typically, no further structuring by machining of the separator plate is necessary.

The final separator plate comprises 10-20% of thermoplastic polymer, 0.5-5% PTFE, and at least 70% carbon powder, for example at least 75% carbon powder. For example, the PTFE concentration in the final separator plate is in the range of 1 to 3% by weight. Such plate has experimentally shown excellent temperature stability, chemical resistance, and high electrical conductivity. It is therefore a proper candidate for separator plates, for example bipolar plates, in fuel cell systems, especially fuel cell stacks.

All percentages are relative concentrations by weight.

SHORT DESCRIPTION OF THE DRAWINGS

The invention will be explained in more detail with reference to the drawing, where FIG. 1 is a perspective exploded view of a fuel sell stack assembly according to the present invention showing bipolar plates, membranes, sealants and endplates;

DETAILED DESCRIPTION/PREFERRED EMBODIMENT

Figure 1:
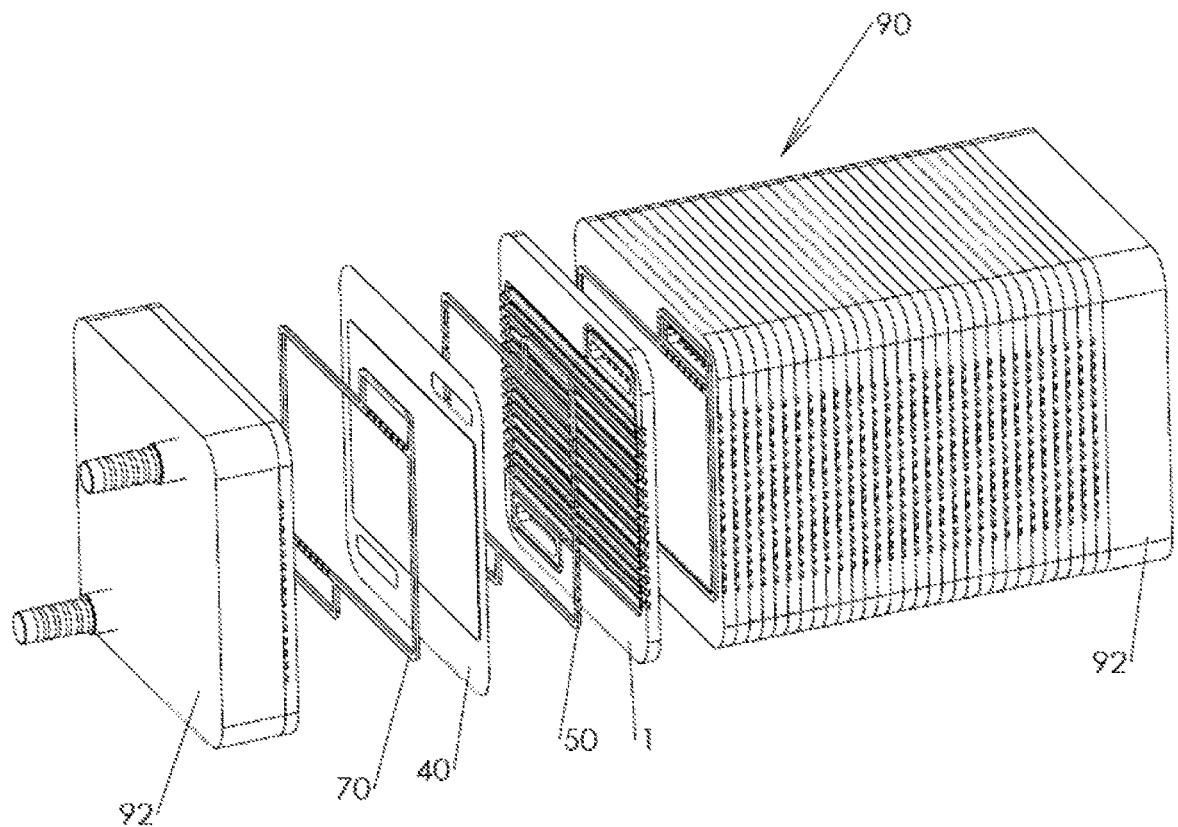
Figure 2:
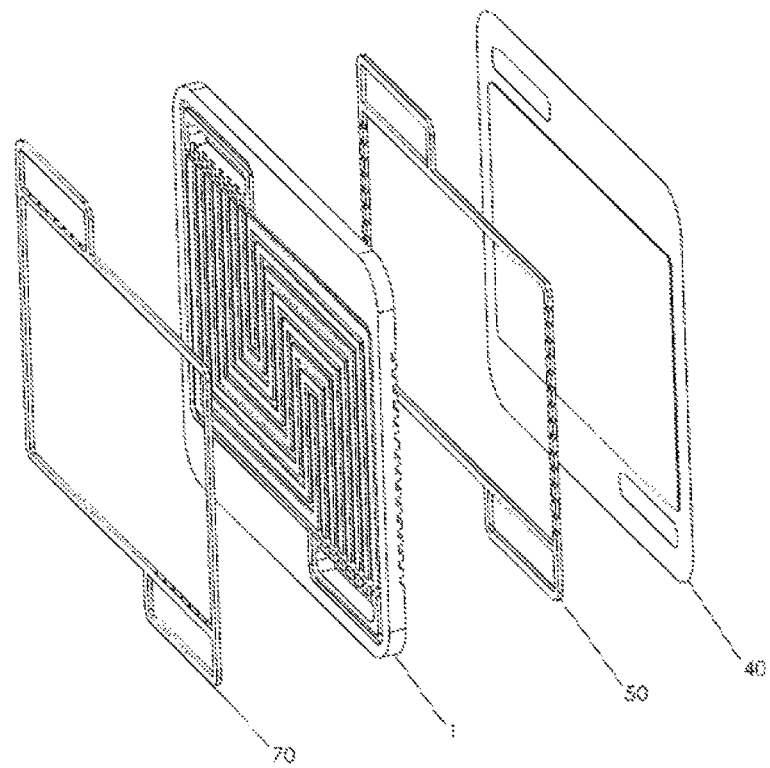
FIG. 2 is a perspective view of the cathode side of one "sandwich element" comprising (from left to right): a sealant for sealing off the cathode side of a PEM bipolar plate; a PEM bipolar plate; a sealant for sealing off the anode side of a PEM bipolar plate; and finally a membrane.
Figure 3:
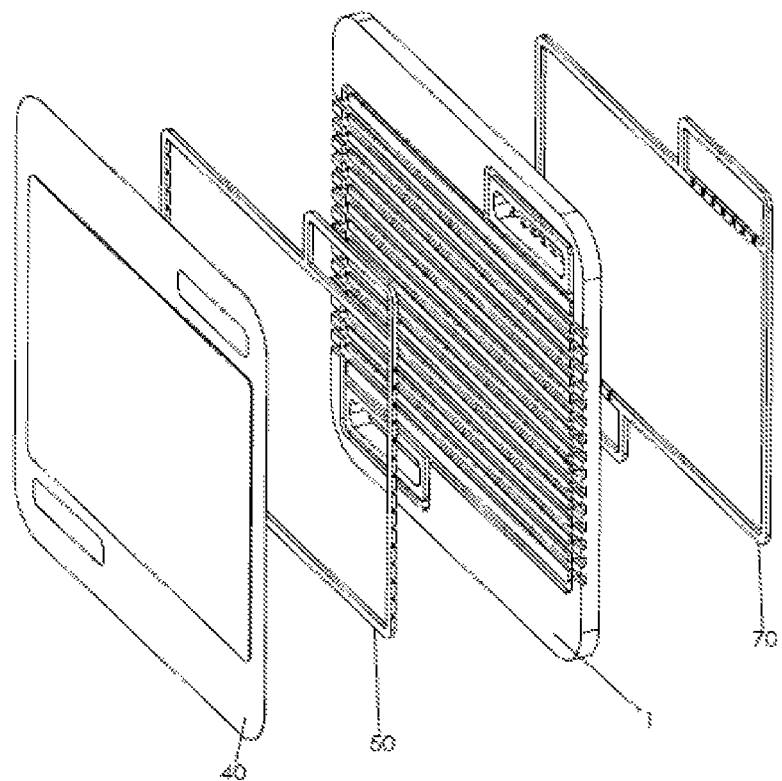
FIG. 3 is a perspective view of the anode side of one "sandwich element" comprising (from left to right): a membrane; a sealant for sealing off the anode side of a PEM bipolar plate; a PEM bipolar plate; and finally a sealant for sealing off the cathode side of a PEM bipolar plate.
Figure 4:
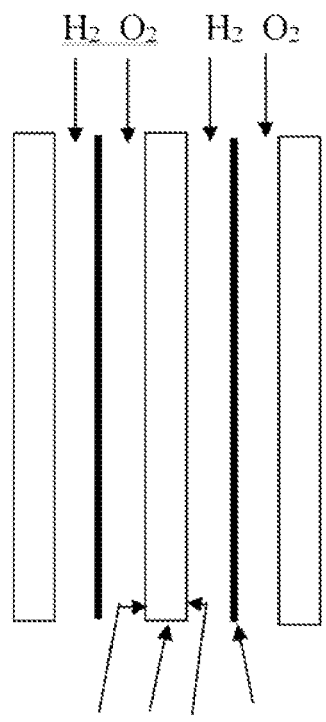
FIG. 4 illustrates a fuel cell stack principle, where a bipolar plate is used between electrolytic membranes.

FIG. 1 illustrates a PEM fuel cell stack 90 comprising a plurality of bipolar plates 1 assembled between endplates 92. Proton exchange membranes (PEM) 40 between adjacent bipolar plates 1 are sealed against the environment by sealants 70 and 50. FIG. 2 is a perspective view onto the cathode side of the bipolar plate 1 assembly comprising the membrane 40 and a sealant 70 for sealing off the cathode side of a PEM bipolar plate and a sealant 50 for sealing off the anode side of a PEM bipolar plate. Correspondingly, FIG. 3 is a perspective view onto the anode side of the bipolar plate 1 assembly. The cathode side comprises a serpentine channel pattern for flow of oxygen gas along the membrane 40 and efficient cooling by the oxygen gas, typically air. The anode side comprises straight channels for transport of hydrogen along the membrane 40. FIG. 4 illustrates such configuration with a bipolar plate 10, on the anode side 28 of which a hydrogen flow is provided for donating protons to the electrolytic membrane 30 and with a cathode side 26 on which oxygen or air or other fluid flows for accepting protons from the membrane 30. The cathode fluid, for example oxygen or air is used as a cooling medium for cooling the bipolar plate. The cathode side 26 of the bipolar plate 1 is provided with a serpentine channel pattern as described above.

Exemplary details of the channel patterns and other details of the bipolar plate are explained in WO2009/010066 and WO2009/010067.

Figure 5:
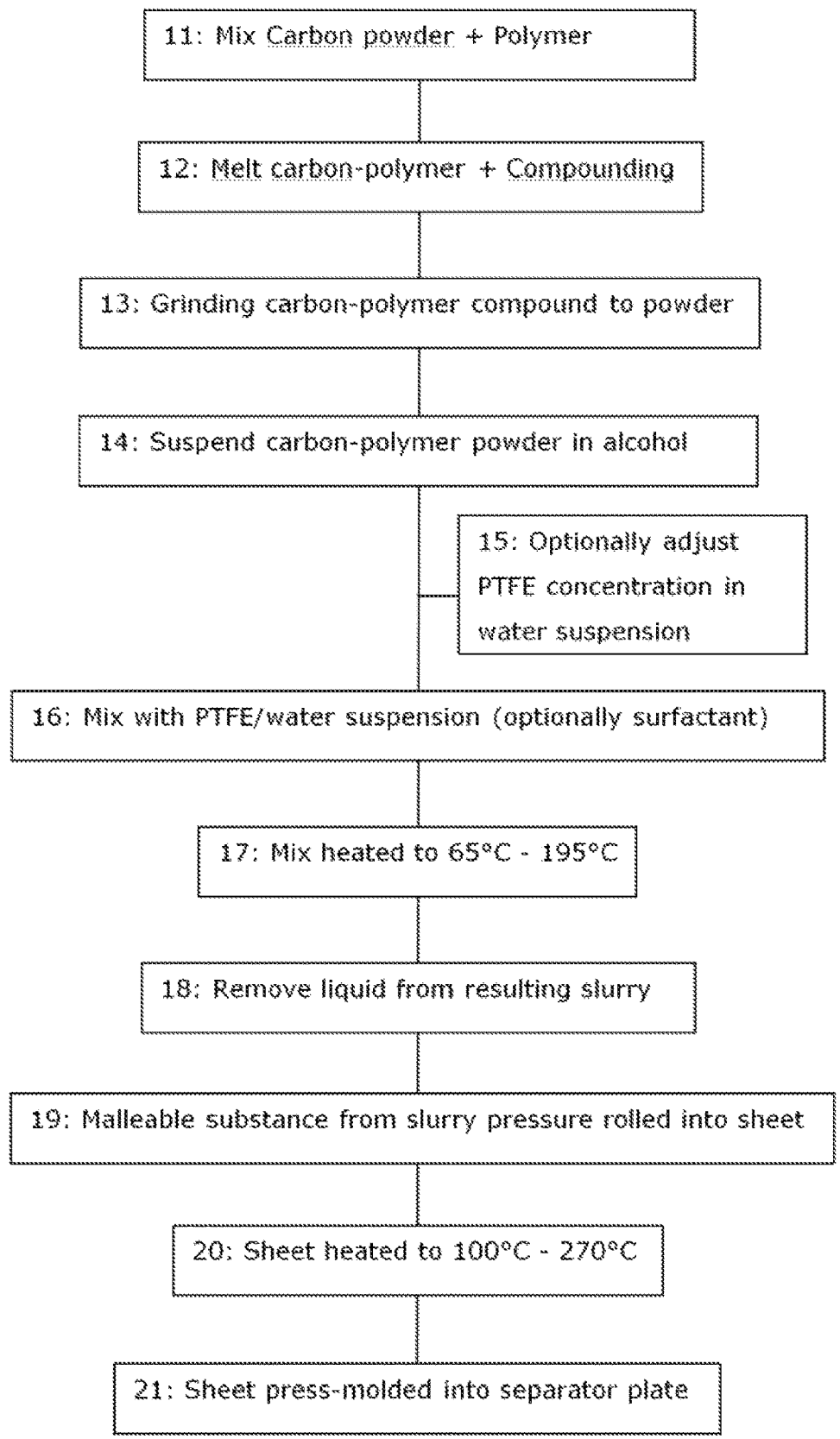
FIG. 5 illustrates stages of the production method of a separator plate.

With reference to FIG. 5, production methods are explained for producing such bipolar plates.

Graphite powder with an average grain size in the range of 0.25 to 5 microns is provided and mixed with 10-20% of thermoplastic polymer, see step 11 in FIG. 5. The percentage by weight and calculated relatively to the weight of the mix of carbon and polymer. An example of a thermoplastic polymer is PPS, which is advantageous due to its high chemical stability.

As illustrated in stage 12, the polymer is heated until molten, and the carbon is thoroughly mixed with the polymer, for example by stirring the molten polymer with the carbon powder. The mix is then compounded into pellets, for example by use of a compounder with a pelletizer.

Once, hardened, the pellets are ground into fine powder in a grinder, see step 13. A typical average grain size is few micrometres, for example in the range of 2 to 5 micrometres. Due to the thorough mixing, each grain of the powder comprises carbon and polymer. However, the concentration of polymer is so low, namely only 10-20%, that a proper electrical conductivity is maintained. For example, the specific resistance of the compounded material is 5-12 mΩ·cm at 25° C.

The ground fine carbon-polymer powder is then suspended in alcohol, see step 14. For the suspension, alcohol is a preferred basis, for example, methanol, ethanol, propanol, iso-propanol, butanol, iso-butanol, pentanol, iso-pentanol, hexanol, iso-hexanol, heptanol, iso-heptanol, octanol, iso-octanol or their mixtures. The alcohol acts as a surfactant for the carbon, which is hydrophobic, adsorbing on its surface and thereby improving wettability of carbon particles by aqueous suspension of PTFE. A preferred surfactant is iso-propanol which has good surface activity, high solubility in water as well as relatively low boiling point.

The carbon-polymer alcohol suspension is mixed with a water-based suspension comprising finely divided particulate PTFE, see step 16. For example, the PTFE particles have a size in the range of 0.2 to 10 microns, optionally in the range of 0.5 to 5 microns or even in the range of 0.5 to 2 microns. Optionally, in order to further prevent clogging of the particulate PTFE in the suspension, the suspension comprises a surfactant. An example of a surfactant is Triton X-100™, which is a nonionic and has a hydrophilic polyethylene oxide chain and an aromatic hydrocarbon lipophilic or hydrophobic group. The hydrocarbon group is a 4-phenyl group. The formula is C14H22O(C2H4O)n(n=9–10).

As an option, the PTFE water suspension is diluted with water in order to lower the PTFE concentration, for example to 2-10%, prior to mixing with the carbon-polymer powder alcohol suspension in order to reduce the risk for agglomeration of the PTFE particles during mixing with alcohol.

The mixture of the two suspensions is heated to a temperature in the range of 65° C. to 195° C., see step 17, the temperatures determined by the boiling points of the used alcohol. The mixture is kept at this temperature for a time in the range of 2 to 20 minutes resulting in a slurry of agglomerated particles, which sediment into a sludge remaining as a malleable and pliable substance. The evaporation is stopped before the liquid level lowers so much that the sludge dries. Also, typically, some remains of alcohol are desired for the rolling process. If the liquid level is well above the sludge level, the remaining liquid is removed, for example by pouring it off the surface of the sludge, see step 18.

Thus malleable and pliable substance is rolled into a sheet by a rolling press while the substance is still wet from the liquid, typically alcohol, and potentially a small amount of water, see step 19. The rolling can be done without heated rollers, however, the evaporation of the residual liquid is faster when rolling at elevated temperature, for example at a temperature in the range of 65-195° C. Residuals of alcohol play a role as plasticizer to PTFE, and it is believed that PTFE creates a fiber-like structure with the graphite/polymer compound when being exposed to the rolling press.

The rolled sheet is further kept at a temperature in the range of 100° C. to 270° C. in the range 10 to 60 minutes to remove all liquid residuals, for instance, alcohol, water and potential surfactants, optionally Triton X-100™, see step 20.

An example of a rolling process for carbon/polymer mixes is disclosed in US2005/0271798. A similar rolling procedure can be applied in connection with this method.

The rolled structure is moulded under pressure, potentially at elevated temperature, in a stationary mould in which the separator plates are formed, see step 21. For example, the moulding is done at elevated temperature and at a pressure in the range of 20 to 60 MPa, for example in a range of 30-50 MPa. A suitable elevated temperature is in the range of 250-320° C., for example in the range of 280-300° C., well below the sintering temperature of PTFE, which is typically in the range of 360-380° C., slightly above the crystalline melting point PTFE. When heating PTFE to or above the sintering point, it decomposes, which is to be avoided. As an alternative, moulding is done at lower temperature and higher pressure. For example, the moulding is done at a temperature between at room temperature or between 25° C. and 200° C. at pressures of 200-400 MPa.

The structuring of the separator plates in the mould includes the potential forming of a flow pattern, for example channels for flow of hydrogen fuel, oxygen-containing gas, or coolant, for example liquid coolant, such as water. After the moulding, typically, no further structuring by machining of the separator plate is necessary.

The production method is not only suitable for bipolar plates. It applies equally well to other separator plates, such as cathode plates, anode plates and cooling plates. Such examples are illustrated in FIGS. 6 and 7.

Figure 6:
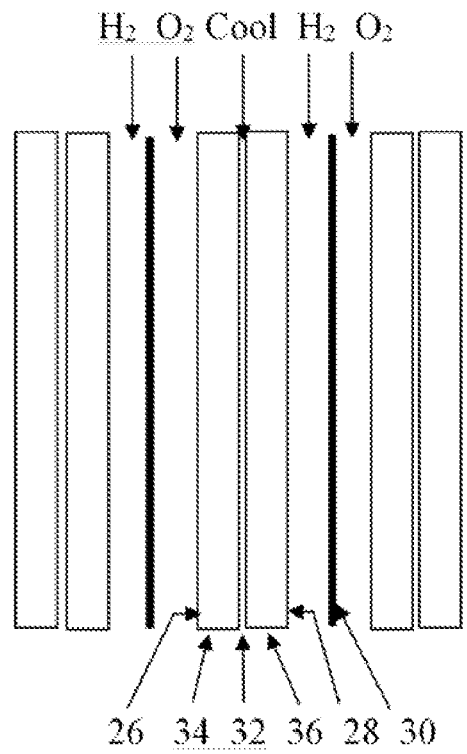
FIG. 6 illustrates alternative fuel cell stack principles, where an anode plate and a cathode plate are oriented back-to-back with a cooling section between the anode plate and the cathode plate.

FIG. 6 illustrates an embodiment, where a cathode plate 34 with a cathode side 26 is combined with an anode plate 36 with anode side 28 and with cooling fluid 32, for example gas or liquid in a space 32 between the two plates. In the space 32, the cathode plate 34 or the anode plate 36 are provided with a channel pattern for example serpentine channel pattern, as described above for efficient cooling by the cooling fluid.

Figure 7:
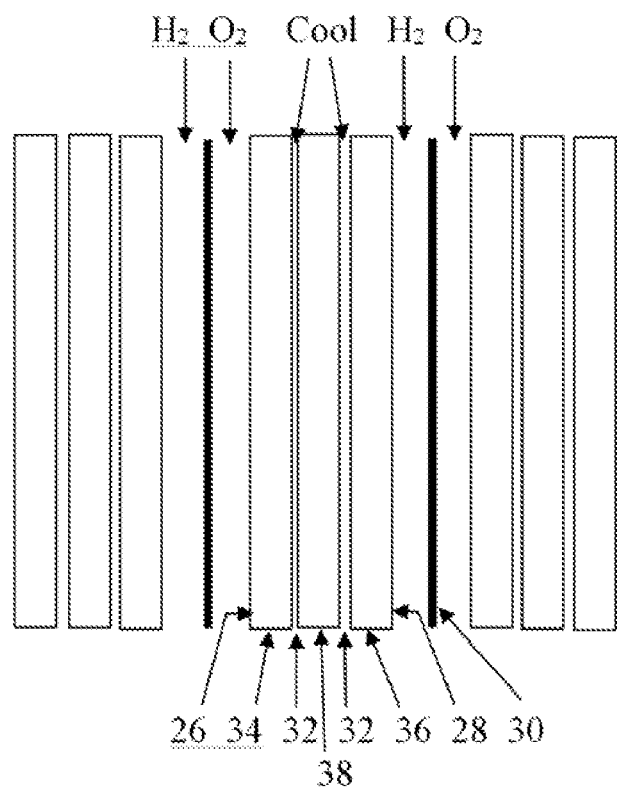
FIG. 7 illustrates a further alternative fuel cell stack principle, where a cooling plate is sandwiched between a cathode plate and an anode plate and cooling is provided in the volume between the cooling plate and the anode plate and in the volume between the cooling plate and the cathode plate.

FIG. 7 illustrates a further alternative, where a cathode plate 34 and an anode plate 36 are sandwiching a cooling plate 38 such that two cooling spaces 32 are provided, one cooling volume between the cooling plate 38 and the cathode plate 34 and another cooling volume between the cooling plate 38 and the anode plate 36. The cooling plate 38 is provided with a channel pattern on both of its sides, for example a serpentine channel pattern as described above.

The invention claimed is:

1. A method comprising producing a separator plate for a fuel cell by providing a material blend of powder of at least 70% carbon powder, 0.5-5% PTFE, PolyTetraFluoroEthylene, and 10-20% thermoplastic polymer different from PTFE, all percentages by weight of the material, and moulding the blend into a separator plate, wherein the method further comprises providing the blend of powder as a suspension, sedimenting the powder as slurry in the suspension, removing excess liquid from the slurry and press moulding the slurry in a mould into a shape of a separator plate.

2. The method according to claim 1, wherein the method further comprises
   melting the thermoplastic polymer and mixing the thermoplastic polymer with carbon-powder to provide a carbon-loaded polymer;
   compounding the carbon-loaded polymer mix into pellets;
   grinding the pellets into carbon-polymer powder;
   providing a suspension of finely divided PTFE particles;
   mixing the carbon-polymer powder with the PTFE suspension to provide a carbon/polymer/PTFE suspension;
   heating the carbon/polymer/PTFE suspension at a first temperature to cause evaporation of liquid from the suspension until a wet slurry of agglomerated particles sediments remains as a malleable and pliable substance;
   removing excess liquid from the malleable and pliable substance;
   press rolling the malleable and pliable substance into a sheet;
   keeping the sheet at a second temperature in the range of 100° C. to 270° C. until all liquid residuals are evaporated;
   press moulding the sheet in a mould into a shape of a separator plate.

3. The method according to claim 2, wherein the method further comprises
   suspending the carbon-polymer powder in a first liquid to provide a carbon-polymer powder suspension,
   providing the finely divided PTFE particles suspended in a second liquid;
   mixing the carbon-polymer powder suspension with the PTFE suspension to provide the carbon/polymer/PTFE suspension.

4. The method according to claim 3, wherein the first liquid is an alcohol, or wherein the first liquid comprises an alcohol or a blend of alcohols as the main ingredient.

5. The method according to claim 3, wherein the first temperature is in the range of 65° C. to 195° C.

6. The method according to claim 1, wherein the carbon powder is graphite powder.

7. The method according to claim 1, wherein the polymer is polyphenylene sulfide.

8. The method according to claim 1, wherein the moulding is done at a pressure in the range of 40 to 100 MPa and at a temperature in the range of 200-330° C., or wherein the moulding is done at a pressure in the range of 200 to 400 MPa and at a temperature in the range of 25-200° C.

9. The method according to claim 1, wherein the separator plate is a bipolar plate, and the method comprises moulding the slurry into a bipolar plate with a flow channel pattern on each side of the bipolar plate.

10. A method of producing a fuel cell stack, the method comprising, producing a plurality of separator plates by a method according to claim 1, arranging the plurality of separator plates as an array with fuel cell membranes between the plurality of separator plates, the membranes separating the hydrogen fuel from the oxygen gas.

\* \* \* \* \*